United States Patent [19]

Akahoshi et al.

[11] Patent Number: 6,033,637
[45] Date of Patent: Mar. 7, 2000

[54] METHOD FOR TREATING COMBUSTION ASHES

[75] Inventors: Toshiaki Akahoshi; Akira Sakuma; Aritoshi Inoue; Masami Iijima, all of Ibaraki-ken, Japan

[73] Assignee: Kashima-Kita, Electric Power Corporation, Japan

[21] Appl. No.: 08/993,159

[22] Filed: Dec. 18, 1997

[30]     Foreign Application Priority Data

Dec. 25, 1996 [JP] Japan .................................. 8-356146
Jan. 17, 1997 [JP] Japan .................................. 9-019963
Feb. 21, 1997 [JP] Japan .................................. 9-053840

[51] Int. Cl.⁷ ...................................................... C01F 11/46
[52] U.S. Cl. .......................... 423/155; 423/356; 423/357; 423/555; 423/658.5; 110/344
[58] Field of Search ............................... 110/165 R, 344; 423/356, 658.5, 455, 357, 155

[56]          References Cited

U.S. PATENT DOCUMENTS

| 4,111,759 | 9/1978 | Didyez et al. ........................... 203/7 |
| 4,140,586 | 2/1979 | Kwasnoski et al. ..................... 203/47 |
| 4,668,250 | 5/1987 | Drese ....................................... 55/70 |

FOREIGN PATENT DOCUMENTS

| 542096 | 6/1957 | Canada .................................. 433/356 |
| 0620187 A1 | 10/1994 | European Pat. Off. . |
| 55-28760 | 2/1980 | Japan . |
| 60-19086 | 1/1985 | Japan . |
| 60-46930 | 3/1985 | Japan . |
| 5-13718 | 1/1993 | Japan . |

OTHER PUBLICATIONS

Patent Abstracts of Japan, vol. 009, No. 134, (C–285), Jun. 8, 1985, JP 60–019086.
Patent Abstracts of Japan, vol. 010, No. 377, (C–392), Dec. 16, 1986, JP 61–171583.
Patent Abstracts of Japan, vol. 010, No. 377, (C–392), Dec. 16, 1986, JP 61–171582.
Chemical Abstracts, vol. 89, No., 22, Dec. 27, 1978, JP 53 035258.

*Primary Examiner*—Steven P. Griffin
*Assistant Examiner*—Timothy C Vanoy
*Attorney, Agent, or Firm*—Parkhurst & Wendel, L.L.P

[57]          ABSTRACT

A method is provided for treating ashes from the combustion of petroleum fuels by mixing the combustion ashes with water to produce a slurry; injecting either calcium oxide or calcium hydroxide into the slurry and reacting the calcium oxide or calcium hydroxide with the ammonium sulfate within the ashes to produce a slurry containing gypsum and ammonia; flowing the slurry containing gypsum and ammonia down from the top portion of packed column and air or steam up from the bottom portion of the packed column so that the air or steam strips the ammonia from the gypsum slurry; and separating the gypsum from the resulting ammonia-free slurry using a solid/liquid separator.

4 Claims, No Drawings

METHOD FOR TREATING COMBUSTION ASHES

BACKGROUND OF THE INVENTION

The present invention relates to a wet-processing method for combustion ashes of petroleum fuels, containing ammonium sulfate and a method of utilizing ammonia components recovered by the wet-processing method. More in particularly the present invention relates to a wet-processing method which comprises at least a preparing-step of a slurry of combustion ashes of mixing combustion ashes and water, a double decomposition step for ammonium sulfate, a recovering-step of free ammonia from a gypsum slurry containing free ammonia produced in the double decomposition step, and a gypsum separation step successively, which is excellent in an ammonia stripping efficiency from the gypsum slurry in the ammonia recovery step and in which the clogging in a stripping device is suppressed, as well as a method of utilizing ammonia components with an industrial advantage.

In various kinds of combustion furnaces (combustion devices) using petroleum fuels such as heavy oils and or emulsions, etc., for example, boilers of oil fired power stations and dust incinerators, ammonia is added in the combustion gases for preventing the corrosion of the combustion furnaces, caused by sulfate gases (S03) contained in combustion gases.

Accordingly, the combustion ashes collected and recovered by an electrostatic precipitator disposed to the downstream of a fire flue end thereof contain ammonium sulfate in addition to ashes mainly composed of unburnt carbon and heavy metals (Ni, V, Mg, etc.). For example, the following ingredients are contained in the combustion ashes recovered from a boiler using high sulfur-content heavy oils.

C: 10 to 80% by weight
$NH_4$: 0.5 to 20% by weight
$SO_4$: 20 to 60% by weight
V: 1 to 5% by weight
Ni: 0.3 to 2% by weight
Fe: 0.3 to 2% by weight
Mg: 0.1 to 8% by weight
$SiO_2$: about 0.1% by weight As a method of treating the combustion ashes, a lot of methods, referred to as a wet-process, for recovering valuable ingredients such as vanadium, which take a countermeasure for public pollution by a closed system, have been proposed. Specifically, there can be mentioned wet-processes, for example, as disclosed in Japanese Patent Application Laid-Open (KOKAI) Nos. 60-19086 and 60-46930, and Japanese Patent Publication (KOKOKU) Nos. 4-61709 and 5-13718 already proposed.

For example, the process described in Japanese Patent Publication (KOKAI) No. 5-13718 comprises (i) a first step of mixing combustion ashes and water to form a slurry, while optionally adding sulfuric acid to control the pH value to not more than 3, (ii) a second step of separating solids (unburnt carbon, etc.), (iii) a third step of heating the obtained liquid portion to a temperature of not less than 70° C. and oxidizing metals while supplying ammonia and an oxidant to adjust the pH value to 7 to 8, (iv) a fourth step of separating deposits (iron sludges), (v) a fifth step of cooling the obtained liquid portion to a temperature of 40° C., thereby depositing vanadium compounds (ammonium metavanadate), (vi) a sixth step of separating the deposited vanadium compounds, (vii) a seventh a step of adding calcium hydroxide or calcium oxide to the obtained liquid portion to deposit gypsum and metal (nickel and magnesium) hydroxides, and liberating ammonia simultaneously, (viii) an eighth step of recovering ammonia by stripping from free ammonia, and (ix) a ninth step of separating the obtained gypsum.

However, there are drawbacks in the ammonia recovery methods described in the above-mentioned publications, respectively.

Namely, the method disclosed in Japanese Patent Application Laid-Open (KOKAI) No. 60-19086 is a method comprising complicated steps of precipitating gypsum from a slurry before stripping, and passing the resultant supernatant through a distillation column to strip an ammonia gas. Such a method is industrially disadvantageous, in which calcium compounds such as gypsum and magnesium hydroxide tend to be deposited on the inner wall surface of the distillation column and the operation thereof can not be continued for a long time.

Further, the method described in Japanese Patent Application Laid-Open (KOKAI) No. 60-46930 is a method comprising supplying steams from the lower portion of an aerating tank so as to heat to a temperature of not less than 80° C. and supplying air from the lower portion thereof so as to strip ammonia. In this method, the stripping efficiency is poor because the contact between the slurry and air is insufficient, and continuous operation is difficult.

Further, the methods described in Japanese Patent Publication (KOKOKU) Nos. 4-61709 and 5-13718 comprise supplying a slurry containing a large amount of gypsum to a separation column from the upper portion thereof but no concrete example for the separation column is described.

Referring to the recovered ammonia, it is supplied to a fire flue of a boiler or a metal oxidation step for reutilization. However, since ammonia separated from each of the processes described above is a gasous mixture containing a water content (moisture) evaporated from the slurry and a large amount of air, pipelines of a large diameter are required for transporting to a place to be utilized. Further, since the water content contained therein is condensed into drains, a draining device has to be disposed at the midway of long distance pipelines, which is disadvantageous in view of maintenance.

As a result of the present inventors' earnest studies, it has been found that in a recovering-ammonia step of a wet-processing method for combustion ashes of petroleum fuels, by flowing down a gypsum slurry from the upper portion of a packed column and blowing air or stream from the lower portion thereof so as to bring air or stream into countercurrent contact with the gypsum slurry, ammonia is stripped from the gypsum slurry, an ammonia stripping efficiency from the gypsum slurry in the ammonia recovery step of the wet-processing method is excellent and the clogging in the packed column is suppressed, that is, though it has been considered that the packed column can not be used for a slurry containing a large amount of solids because of a clogging problem since the packed column contains a large amount of packings and has a narrowed channel, the packed column in the wet-processing method can be used with no practical problem. On the basis of the above-mentioned finding, the present invention has been attained.

SUMMARY OF THE INVENTION

An object of the present invention is to provide a wet-processing method for combustion ashes of petroleum fuels, containing at least ammonium sulfate and vanadium, which comprises a preparing-step of a slurry of combustion ashes, obtained by mixing combustion ashes and water; a double decomposition step for ammonium sulfate; a recovering-step of free ammonia from a gypsum slurry containing free ammonia produced in the double decomposition step; and a gypsum separation step successively, which is excellent in an ammonia stripping efficiency from the gypsum slurry in the ammonia recovery step and in which clogging in a stripping device (for example, packed column) is suppressed.

Another object of the present invention is to provide an improved method of utilizing ammonia components at a high efficiency, which comprises efficiently transporting the thus obtained ammonia and supplying ammonia into an exhaust gas channel of a combustion furnace, etc.

To accomplish the aims stated above, in a first aspect of the present invention, there is provided a wet-processing method for combustion ashes of petroleum fuels, collected by a dust collector disposed in a fire flue of an exhaust gas for a boiler or the like using petroleum fuels and containing at least ammonium sulfate and vanadium, which method comprises:

at least
- a preparing-step of a slurry of combustion ashes by mixing the combustion ashes with water,
- a double decomposition step for ammonium sulfate,
- a recovering-step of free ammonia from a gypsum slurry containing free ammonia obtained in the double decomposition step,
- the gypsum slurry being flowed down from an upper portion of a packed column and air or steams being blown from a lower portion of the packed column to bring air or steams into counter-current contact with the gypsum slurry, thereby conducting stripping for ammonia, and
- a gypsum separation step.

In a second aspect of the present invention, there is provided a method of utilizing an ammonia component recovered by the wet-processing method as defined in the first aspect, which method comprises:
- transporting a mixture of ammonia stripped in the ammonia recovery step and steams in the form of an aqueous solution to an ammonia separation device disposed in a battery limit of an ammonia supply device in an exhaust gas channel of a combustion furnace;
- mixing a gaseous ammonia separated and recovered by the ammonia separation device with air;
- heating the mixture; and
- supplying the resultant mixture into the exhaust gas channel of the combustion furnace.

In a third aspect of the present invention, there is provided a method of utilizing the ammonia component recovered by the wet-processing method as defined in the first aspect, for the preparation of ammonium metavanadate, which method comprises:
- a solid-liquid separation step of removing solids from the slurry of the combustion ashes,
- a metal oxidation step of supplying ammonia and an oxidative gas to an aqueous solution formed by removing the solids from the slurry of the combustion ashes to oxidize vanadium, thereby obtaining an aqueous solution containing ammonium metavanadate, and
- a crystallization step for the obtained ammonium metavanadate,
- the above-mentioned three steps being incorporated between the preparing-step of the slurry of the combustion ashes and the double decomposition step of ammonium sulfate as defined in the first aspect, and
- a mixture of ammonia stripped in the ammonia recovery step and steams being transported in the form of an aqueous solution to the metal oxidation step.

In a fourth aspect of the present invention, there is provided a method of utilizing the ammonia component recovered by the wet-processing method as defined in the first aspect for the preparation of ammonium metavanadate, which method comprises:
- a metal oxidation step of supplying ammonia and an oxidative gas to the slurry of combustion ashes to oxidize vanadium, thereby obtaining a slurry containing ammonium metavanadate,
- a solid/liquid separation step of removing solids from the slurry containing ammonium metavanadate, and
- a crystallization step of the obtained ammonium metavanadate,
- the above-mentioned three steps being incorporated between the preparing-step of the slurry of the combustion ashes and the double decomposition step as defined in the first aspect,
- a mixture of ammonia stripped in the ammonia recovery step and steams being transported in the form of an aqueous solution and supplied to the metal oxidation step.

In a fifth aspect of the present invention, there is provided a method wherein in the method as defined in the third or fourth aspect, an oxidation vessel in which a gas supply pipe is disposed to protrude in a reaction material is used, and heated steams are introduced together with the oxidizing gas from the gas supply pipe.

In a sixth aspect of the present invention, there is provided a method wherein in the method as defined in the third or fourth aspect, the reaction in the metal oxidation step is taken place at a high temperature condition of not less than 100° C. under a pressure to obtain an aqueous solution in which the concentration of ammonium metavanadate is not more than the saturation concentration at the temperature of the aqueous solution and not less than 1.2% by weight, and the concentration of an ammonium sulfate is from 5 to 30% by weight, and
- the obtained aqueous solution is transported under pressure and a temperature retaining condition through the supply pipe and supplied to a crystallization vessel in the crystallization step.

In a seventh aspect of the present invention, there is provided a method wherein, in the method as defined in the fourth or fifth aspect, a continuous crystallization method of cooling and crystallization an aqueous solution containing ammonium metavanadate supplied at a constant rate continuously to the crystallization vessel is used in the crystallization step,
- a crystallization device comprising the crystallization vessel and a cooler disposed to the outside thereof which are connected by means of a circulation channel is used,
- a slurry in the crystallization vessel in an amount more than that of the raw material solution supplied is circulated to the cooler, and
- a slurry substantially identical in the amount with that of the raw material solution supplied is withdrawn from the crystallization device.

In an eighth aspect of the present invention, there is provided a method wherein in the method as defined in the first aspect, two units of solid/liquid separators are used in series in the gypsum separation step, with the first solid/liquid separator being a centrifugal precipitation-type solid/liquid separator and the final solid/liquid separator being a centrifugal precipitation-type solid/liquid separator or a filtration type solid/liquid separator, and which method comprises:

processing a gypsum-containing slurry (A) by the first solid/liquid separator, separating into gypsum (C) and a supernatant (B) containing nickel and/or magnesium hydroxide mixed from the gypsum-containing slurry (A) and containing 1 to 20% by weight of gypsum, calculated as solids, based on the hydroxides, and processing the supernatant (B) by the final solid/liquid separator to separate into a solid (D) and a waste water (E) not substantially containing the solid.

DETAILED DESCRIPTION OF THE INVENTION

The present invention is explained specifically herein.

Description is made at first for a wet-processing method for combustion ashes of petroleum fuels, containing ammonium sulfate, that is, a method of recovering ammonium components from the combustion ashes of petroleum fuels.

Combustion ashes as an objective to be processed in the present invention are combustion ashes containing at least ammonium sulfate and vanadium, which are collected by a dust collector disposed, for example, at the end of an exhaust gas flue of a boiler using petroleum fuels. Such combustion ashes are obtained by being collected in an electrostatic precipitator of various kinds of combustion furnaces (combustion devices) operated with addition of ammonia to combustion gases.

The wet-process in the present invention comprises at least a preparing-step of a slurry of combustion ashes by mixing combustion ashes with water, a double decomposition step for ammonium sulfate, and a recovery recovering-step of free ammonia from a gypsum slurry containing free ammonia (free ammonia-containing gypsum slurry) obtained in the double decomposition step and a gypsum separation step successively, to which optional steps may be added so long as the above-mentioned steps are included.

In a preferred embodiment of the present invention, that is, in a method of utilizing ammonia components for producing ammonium metavanadate, steps of the following process (1) or (2) are conducted between the preparing-step of the slurry of the combustion ashes and the double decomposing step for ammonium sulfate.

(1) A solid/liquid separation step of removing solids from the slurry of the combustion ashes; a metal oxidation step of supplying ammonia and an oxidative gas to an aqueous solution obtained by removing solids from the slurry of combustion ashes to oxidize vanadium, thereby obtaining an aqueous solution containing ammonium metavanadate; and a crystallization step of the thus obtained ammonium metavanadate are disposed, successively.

(2) A metal oxidation step of supplying ammonia and an oxidative gas to the slurry of combustion ashes to oxidize vanadium, thereby obtaining a slurry containing ammonium metavanadate; a solid/liquid separation step of removing solids from a slurry containing ammonium metavanadate; and a crystallization step of the thus obtained ammonium metavanadate, successively.

The preparing-step of the slurry of combustion ashes is, for example, a method of mixing combustion ashes of petroleum fuels and water, adding sulfuric acid to the mixture to adjust the pH value to 1.5 to 3, heating the resultant mixture to a temperature of 40 to 70° C., thereby converting metals such as vanadium into ions, and dissolving ammonia as ammonium sulfate.

In the solid/liquid separation step of the above-mentioned processes (1) and (2), known methods using, for example, a centrifugal separator or filter press are adopted. The metal oxidation step and crystallization step in these processes will be described later.

In the double decomposition step of ammonium sulfate, calcium hydroxide or calcium oxide is used as a strong base. The strong base is used usually in a stoichiometrical or slightly excess amount to sulfate radicals in the gypsum to be formed. By the double decomposition, the free ammonia-containing gypsum slurry is formed. Due to the presence of free ammonia and unreacted calcium hydroxide or the like, the pH value of the gypsum slurry is usually from 9 to 12, preferably from 10 to 11.

In the ammonia recovery step, a counter-current type packed column which is most excellent in the stripping efficiency is used. Then, free ammonia contained in the gypsum slurry is stripped. When a plate column is used for striping free ammonia, because the slurry is deposited to each of the trays, continuous operation for the stripping of the gypsum slurry is difficult. Further, since a wetted wall column has no trays as in the plate column and contains no packings, it suffers less clogging even in a case of a gypsum slurry containing a large amount of solids, but the area of contact between the gypsum slurry and the counter-current gas is small, so that the stripping efficiency for free ammonia is low.

The inside of the counter-current type packed column is structured such that packings with large surface area such as Raschig rings, Lessing rings and saddle-type packings are packed in a large amount. Then, the gypsum slurry flows down along the surface of the packings. Accordingly, the counter-current type packed column has a large area of contact between the gypsum slurry and the counter-current gas, and is excellent in the efficiency of stripping free ammonia.

The pH value of the gypsum slurry supplied to the packed column is adjusted to preferably not less than 11, more preferably not less than 12. If the pH value is less than 11, the amount of magnesium hydroxide dissolved in the slurry may be increased, and as a result, insolubilized magnesium hydroxide may be deposited, for example, on the surface of the packings in the packed column, resulting in a worry of clogging a slurry channel in a case of long time operation.

Further, the concentration of gypsum in the gypsum slurry is adjusted to preferably from 7 to 40% by weight, more preferably from 10 to 30% by weight. If the gypsum concentration is less than 7% by weight, gypsum may tend to be deposited on the inner wall surface of the packed column and the surface of the packings, so that particularly, during long time operation, there is a worry that the gypsum slurry channel may be clogged by the deposition of gypsum. On the other hand, if the gypsum concentration exceeds 40% by weight, since the viscosity of the gypsum slurry may be large, there is a worry that the narrow flow channel upon flowing down in the packed column may be clogged.

In a case of supplying a supernatant obtained by precipitating of gypsum from the gypsum slurry (aqueous saturated solution of gypsum) to the packed column, when the gypsum is crystallized due to the effect of temperature change or the like, since the solid (gypsum) to which crystallized gypsum is deposited is not present in the solution, this results in deposition of gypsum on the inner wall surface of the packed column and the surface of the packings.

There is no particular restriction for the temperature of the gypsum slurry supplied to the packed column, but it is preferably heated for promoting stripping of ammonia. Such a heating temperature is usually from 70 to 110° C., preferably from 90 to 105° C.

As a counter-current gas supplied to the packed column, air and steam may be used. The steam is preferred and further, heated steam is more preferred. The temperature of the steam is usually from 110 to 190° C., preferably from 130 to 160° C. In a case of using the steam as a counter-current gas, since ammonia is separated in the form of a mixture with steam and dissolved into the water content of the steam, it is in the form of an aqueous solution after cooling.

Accordingly, when recovered ammonia is stored or transported to other steps or the devices, the diameter of transportation pipelines can be decreased efficiently, and further, it can be sprayed as it is, when added to the fire flue described later, which is suitable also in view of use.

In a case of using air as the counter-current gas, it is separated as a gaseous mixture of air, ammonia and steam evaporated from the gypsum slurry. In this case, the gaseous mixture is converted into an aqueous solution, for example, by a method of bubbling into water.

Then, a method of utilizing the ammonia components recovered by the wet-processing method described above is described.

In the first utilizing method of the present invention, ammonia recovered by the wet-process is used as a neutralizing agent for a sulfate gas ($SO_3$) contained in exhaust gases of a combustion furnace. Specifically, a mixture of ammonia and steam stripped in the ammonia recovery step is transported in a state of an aqueous solution to an ammonia separation device disposed in a battery limit of an ammonia supply device in an exhaust gas channel of a combustion furnace, and then gaseous ammonia separated and recovered by the ammonia separation device is mixed with air, heated and then supplied to the exhaust gas channel of the combustion furnace. In this case, since ammonia is in the state of an aqueous solution, no draining device is necessary to a transportation pipeline which is required for transporting in a gaseous state, as well as the inner diameter of the transportation pipelines can be reduced since the volume of ammonia is reduced. Accordingly, the first utilization method of the present invention is efficient both in the size reduction of and management for the facility.

As the ammonia separation device, various types of known separation columns can be used. In this case, there can be mentioned a method of supplying aqueous ammonia to the separation column and bringing air or steam as a separation medium into counter-current contact therewith. For the counter-current gas, steam is preferred in view of the separation efficiency.

There is no particular restriction for the ammonia content in the gaseous mixture of ammonia and air, and it is usually from 0.1 to 10% by weight, preferably from 0.5 to 5% by weight. The temperature for heating the gaseous mixture of ammonia and air is usually from 100 to 200° C., preferably from 120 to 180° C. The gaseous mixture of ammonia and air may also contain water. In this case, the water content is preferably not more than 10% by weight based on the weight of the entire gaseous mixture.

As a method of supplying the gaseous mixture of ammonia and air in the exhaust gas channel of the combustion furnace, there can be mentioned, for example, a method of arranging a number of spray nozzles on the wall surface in the channel or in a cross section of the channel, and jetting the gaseous mixture from the nozzle since the gaseous mixture is sprayed as uniformly as possible over the cross section in the exhaust gas channel.

The amount of the gaseous mixture containing ammonia and air is determined depending on the amount of exhaust gases and the concentration of the sulfate gas in the exhaust gases, and usually, it is controlled such that ammonia in the gaseous mixture is in a stoichiometrical or slightly excessive amount relative to the sulfate gas in the exhaust gases.

By the way, there has been known a method of processing an exhaust gas of a combustion chamber by supplying ammonia into the exhaust gas of a combustion furnace at a temperature, for example, of usually not less than 700° C., thereby reducing nitrogen oxides in the exhaust gas of the combustion chamber in a non-toxic state (refer, for example, to Japanese Patent Publication (KOKOKU) No. 56-40628).

In the method of the present invention, recovered ammonia can also be used as a reducing agent for the nitrogen oxides as described above. Known conditions can be applied as they are to processing conditions such as the amount of ammonia supplied to the exhaust gases of the combustion furnace. In a case of using ammonia as the reducing agent for nitrogen oxides, since ammonia is consumed, ammonia has to be added separately as a neutralizing agent for sulfate gas ($SO_3$)

In the second utilization method of the present invention, ammonia recovered by the wet-process is used for the production of ammonium metavanadate. That is, a mixture of ammonia and steam stripped in the ammonia recovery step is transported in the form of an aqueous solution and supplied to the metal oxidation step of (1) or (2) described above.

In this process (1), a solid/liquid separation step—metal oxidation step—crystallization step for ammonium metavanadate are conducted between the preparing-step of the slurry of combustion ashes and the double decomposition step of ammonium sulfate.

In the solid/liquid separation step, the solids (mainly, unburnt carbon and undissolved other components) are removed from the slurry of the combustion ashes to obtain an aqueous solution.

In the metal oxidation step, ammonia and an oxidative gas are supplied to the aqueous solution obtained by removing solids from a slurry of combustion ashes, thereby oxidizing vanadium, and an aqueous solution containing ammonium metavanadate is prepared.

The pH value of the aqueous solution is adjusted to usually not less than 7, preferably 7 to 9. As method of adjusting the pH value of the aqueous solution to not less than 7, there can be mentioned, for example, a method of supplying ammonium or ammonium compound which serves also as a reactant. For adjusting the pH value, in the case where the ammonia component is present in a sufficiently stoichiometrical amount, caustic alkali such as caustic soda may be jointly used only for the purpose of adjusting the pH value, it is preferred to adjust the pH value only by ammonia or ammonia compound in order to avoid introduction of additional chemical species into the reaction system.

As the ammonia component, ammonia recovered in the ammonia separation step of the wet-process as described above is used in the form of an aqueous solution. If necessary, pure ammonia produced separately may be used additionally in the form of an aqueous solution. As the oxidative gas, there can be mentioned, for example, air, oxygen and ozone. Among them, air is preferred in view of practicality.

By the way, for the oxidizing reaction described above, an oxidation vessel in which a gas supply pipe is disposed so as to protrude into an aqueous solution in which vanadium and ammonium are dissolved, but ammonium metavanadate is deposited as scales on the surface of openings of the oxidative gas supply pipe, and in an extreme case, there is caused a trouble such as clogging in the opening of the oxidative gas supply pipe.

Accordingly, in order to solve the foregoing problem, it is preferred to use an oxidization vessel in which the gas supply pipe is disposed so as to be protruded into a reaction material (aqueous solution in which vanadium and ammonium are dissolved) and to introduce heated steam together with the oxidative gas from the gas supply pipe.

As described above, by the introduction of the heated steam together with introduction of the oxidative gas, the concentration of ammonium metavanadate at the opening of the gas supply pipe is diluted, and the temperature lowering on the surface of the opening is suppressed. As a result, the deposition of scales of ammonium metavanadate to the surface of the opening of the gas supply pipe can be prevented. Further, the scaling to a stirring blade disposed near a position above the opening of the gas supply pipe can also be suppressed.

The temperature of the heated steam is usually not less than 100° C. (1 atm), and in a case of reaction in an increased inner pressure, it is preferably not less than 120° C. (about 2 atm), more preferably not less than 135° C. (about 3 atm), even more preferably not less than 155° C. (about 5 atm). The amount of the heated steam to be introduced is usually controlled to such an extent as compensating the calorie corresponding to the lowering of the liquid temperature by the introduction of air.

Preferably, the oxidizing reaction is conducted under a pressure at a high temperature condition of not less than 100° C. so as to obtain an aqueous solution in which the ammonium concentration is not more than the saturated concentration at the temperature of the aqueous solution and not less than 1.2% by weight, and the concentration of ammonium sulfate is from 5 to 30% by weight. This is, because the solubility of ammonium metavanadate is increased unexpectedly along with an increase in the liquid temperature and the miniaturization of the device can be attained markedly. A more preferred lower limit for the reaction temperature is 120° C. The upper limit of the temperature is usually 150° C., preferably 135° C.

In the crystallization step, ammonium metavanadate is crystallized and recovered from an aqueous solution containing ammonium metavanadate obtained in the metal oxidation step. Specifically, ammonium metavanadate is crystallized by cooling a raw material solution supplied continuously at a constant rate to the crystallization vessel.

By the way, in a case of using a crystallization vessel having interior cooling coils, trouble may occur when crystals of precipitated ammonium metavanadate are deposited on the surface of the cooling coils to lower the cooling performance. Accordingly, in order to solve the foregoing problem, it is preferred to use a crystallization device comprising a crystallization vessel and a cooler disposed to the outside thereof, which are connected by a circulation channel.

It is preferred to circulate to the cooler a slurry in the crystallization vessel in an amount more than that of the raw material solution supplied and withdraw from the crystallization device the slurry of an amount substantially equal with that of the raw material solution supplied.

If the slurry in the crystallization vessel is circulated to the cooler in an amount less than that of the raw material solution supplied, it is necessary to take a large difference of the cooling temperature for the slurry in the cooler, and as a result, crystals of ammonium metavanadate are deposited in the cooler and the circulation channel. On the contrary, when the slurry in the crystallization vessel is circulated to the cooler in an amount more than that of the raw material solution supplied, the difference of the cooling temperature for the slurry in the cooler can be reduced.

The amount of the slurry circulated to the cooler and/or the amount of the raw material solution supplied to the crystallization vessel is preferably controlled such that the temperature lowering for the slurry by the cooler is not more than 5° C., and the temperature difference between the raw material solution supplied to the crystallization vessel and the slurry in the crystallization vessel is not less than 30° C. The temperature in the crystallization vessel is set to usually not more than 40° C., preferably from 20 to 30° C.

For the method of recovering ammonium metavanadate, a method of sedimentation and concentration by the use of a centrifugal separator, followed by cake filtration is usually adopted.

When solids such as iron sludges mainly comprising iron oxides by-produced in the metal oxidation step are contained in the aqueous solution of raw material before crystallization, the solids are preferably removed before the crystallization step. By such procedures, ammonium metavanadate at high purity can be isolated.

Then, the process (2) is to be explained. In this process, metal oxidation step—solid/liquid separation step—ammonium metavanadate crystallization step are conducted between the preparing-step of the slurry of the combustion ashes and the double decomposition step for ammonium sulfate.

The process (2) is identical with the process (1) except that the solid/liquid separation step is not conducted at first, but ammonia and oxidative gas are supplied to the slurry of the combustion ashes, thereby converting vanadium into ammonium metavanadate (metal oxidation step), and solids are separated and removed from the resultant slurry of the combustion ashes containing ammonium metavanadate (solid/liquid separation step).

In the solid/liquid separation step, unburnt carbon and iron sludge, etc. by-produced in the metal oxidation step are separated and removed together. In this case, since the pH value in the slurry of the combustion ashes is in an alkaline region, the device used for separation and removal can be suppressed from corrosion.

Accordingly, the process (2) is excellent as compared with the process (1) in that ammonium metavanadate at high purity can be isolated without disposing the solid/liquid separation step for iron sludges.

The gypsum slurry remained after stripping of free ammonia in the ammonia recovery step is supplied to the gypsum separation step.

By the way, Japanese Patent Publication (KOKOKU) No. 5-13718, for example, describes that a centrifugal precipitating solid/liquid separation device is suitable for the separation of gypsum, and the centrifugal precipitation-type solid/liquid separation device is suitable for the separation of nickel sludge (for example, nickel hydroxide), since a filtration-type solid/liquid separation device tends to suffer from clogging.

On the other hand, since gypsum described above can be recovered in a relatively large amount, it can be used in various application uses by separating nickel and/or magnesium hydroxides to refine to a high purity. The purity and the recovery amount of gypsum can be controlled to a desired range by properly selecting the operation conditions of the centrifugal precipitating solid/liquid separation device. For example, in the solid/liquid separation device, the purity of gypsum can be improved by lowering the recovery percentage of gypsum (increasing the gypsum concentration in supernatant).

However, as is well-known, since both of nickel hydroxide and magnesium hydroxide are present as fine particles in a liquid, the clogging tends to occur in the filtration-type solid/liquid separation device in a case of separating such hydroxides from the supernatant as described in the above-mentioned publication. Further, also in the centrifugal precipitation-type solid/liquid separation device, the separation of nickel and/or magnesium hydroxides is not always easy. As a result, there is a worry in the existent wet-processes that solids are contained in the drains and there is a drawback not capable of completely attaining a counter-measure for public pollution by a closed system.

Then, for efficiently conducting the solid/liquid separation of nickel and/or magnesium hydroxides which are difficult to be separated, it is preferred to adapt a system of using two units of the solid/liquid separators in series, as the first solid/liquid separator, a centrifugal precipitation-type solid/liquid separator is used and as the last (final) solid/liquid separator, a centrifugal precipitation-type solid/liquid separator or a filtration-type solid/liquid separator is used. The gypsum-containing slurry (A) is treated by the first solid/liquid separator to separate the gypsum-containing slurry (A) into gypsum (C) and a supernatant (B) containing nickel and/or magnesium hydroxides mixed from the gypsum-containing slurry (A) and containing 1 to 20% by weight based on the weight of the said hydroxides. Then, the supernatant (B) is treated by the last solid/liquid separator to separate the same into a solid (D) and a waste water (E) containing no substantial solid.

The above-mentioned method has a mixing-step of a predetermined amount of gypsum in the supernatant (B) obtained from the first solid/liquid separator.

As a result, when the centrifugal precipitation-type solid/liquid separator (horizontal continuous decanter or the like) is used for the last solid/liquid separator, the precipitation of nickel and/or magnesium hydroxides is promoted by the entraining precipitating effect of gypsum having more excellent precipitating property than that of nickel and/or magnesium hydroxide. Further, when the filtration-type solid/liquid separator (filter press) is used for the last solid/liquid separator, the clogging on the press surface can be suppressed effectively by the coating on the press surface of gypsum having excellent filtration property than that of nickel and/or magnesium hydroxide.

The adjustment for the amount of gypsum contained in the supernatant (B), in a case of using a horizontal-type continuous decanter as the centrifugal precipitation-type solid/liquid separator, is conducted by changing, for example, the feed rate of the slurry (A) to the decanter and the height of a dam disposed to the discharging portion of the supernatant. A preferred mixing amount of gypsum in the supernatant (B) is 3 to 10% by weight by the same reason of the definition described above. Further, as the last solid/liquid separator, use of the filtration-type solid/liquid separator (filter press) is preferred with a view point that the solid concentration in the waste water (E) is low.

According to the present invention described above, the stripping effect for ammonia from the gypsum slurry is excellent and the clogging of the stripping device can be suppressed in the recovering-step of ammonia in the wet-process described above for combustion ashes, and the method of the present invention is of a significant industrial worth.

EXAMPLES

The present invention will be explained more specifically by way of examples but the invention is not restricted only to the following examples, unless it does not exceed the gist thereof.

Example 1

As the combustion ashes of petroleum fuels, combustion ashes containing components as described before were used, which were collected by an electrostatic precipitator disposed in a fire flue of a boiler taking place combustion of C heavy oil while adding ammonia to the fire flue.

(1) Preparing-step of slurry of combustion ashes

The combustion ashes of petroleum fuels and water were mixed at a 1:4 weight ratio, concentrated sulfuric acid was added to adjust the pH value to 3, and then the resultant mixture was heated to 50° C. to continuously prepare a slurry of combustion ashes.

(2) Metal oxidation step

A closed-type oxidation vessel of 10 m$^3$ volume having a gas supply pipe is disposed so as to protrude in a reaction material (combustion ash slurry), equipped with a heating/temperature retaining device, an inner pressure control device, a cooling condenser device, a liquid supply port and a liquid discharge port, and having a stirring blade disposed near a location above the opening of the gas supply pipe was used as an oxidation vessel. The opening at the top end of the gas supply pipe has a doughnut shape with a tube outer diameter of 80 mm and having a number of vent holes with 4 mm inner diameter, to a circular portion situated above.

The slurry of combustion ashes was supplied from the supply port at a ratio of 10 m$^3$/hr by a pressurizing pump under pressure, and the oxidizing reaction was continued while introducing 200 Nm$^3$ of air at a temperature of 50° C. and 0.1 to 0.2 ton/hr of heated steams at 3 atm from the opening of the gas supply pipe into the slurry of the combustion ashes, and vanadium in the slurry of the combustion ashes was converted into ammonium metavanadate.

During the oxidizing reaction, in the oxidation vessel, the temperature of the slurry of combustion ashes was maintained by the heating/temperature retaining device at 125° C., and the internal pressure was maintained to 2.0 kg/cm$^2$G by the internal pressure control device. Further, the slurry of the combustion ashes containing ammonium metavanadate was discharged from the discharge port at the substantially identical rate with the supplied amount, and supply the discharged slurry to the succeeding step while maintaining the liquid surface to a substantially identical level. Further, the steams and the ammonia gas discharged from the valve of the inner pressure control device were cooled by the cooling condenser and refluxed into the oxidation vessel. When the concentration of ammonium metavanadate in the oxidation vessel was actually measured, it was about 1.5% by weight, and the concentration of ammonium sulfate was about 15% by weight.

(3) Solid/liquid separation step

While continuously supplying the slurry of the combustion ashes containing ammonium metavanadate to a pressure proof-type filter and under temperature retaining, unburnt carbon and iron sludges or the like by-produced in the metal oxidation step were separated while retaining the temperature thereof to obtain an aqueous solution containing ammonium metavanadate.

(4) Crystallization step for ammonium metavanadate

Into a crystallization vessel of 50 m$^3$ of an inner volume for containing 40 m$^3$ of crystallized slurry at a temperature of 35° C., a raw material solution at a temperature of 95° C. containing ammonia sulfate at 15 wt% concentration and 4500 ppm of ammonium metavanadate was supplied continuously at a rate of 10 m$^3$/hr and mixed under stirring. At the same time, the crystallized slurry was withdrawn from a discharging port of the crystallization vessel at a rate of 10 m$^3$/hr. Concurrently, a mixed crystallized slurry was continuously supplied at a rate of 120 m$^3$/hr to a counter current cooling column, cooled to 30° C. and fed back to the crystallization vessel. The temperature lowering for the slurry in the counter-current cooling column was 5° C.

The concentration of crystals and the dissolving concentration of ammonium metavanadate in the crystallized slurry in the crystallization vessel were 4410 ppm and 90 ppm respectively, and ammonium metavanadate of 98% by weight in the solution of the raw material was crystallized.

(5) Recovering-step of crystals of ammonium metavanadate

The crystallized slurry withdrawn from the crystallization vessel was separated by using a centrifugal filtration device and ammonium metavanadate was separated by filtration in a cake filtration system, and the obtained filtrate was supplied to a gypsum reactor in the succeeding double decomposition step.

(6) Double decomposition step for ammonium sulfate

Calcium hydroxide was added to the liquid filtrate supplied in the gypsum reactor to conduct double decomposition of ammonium sulfate, thereby obtaining a slurry containing gypsum, ammonia, nickel hydroxide and magnesium hydroxide. The gypsum concentration in the slurry was 12% by weight and the total amount of nickel hydroxide and magnesium hydroxide was 3% by weight. Calcium hydroxide was further added to the gypsum slurry to adjust the pH value to 12.5. The gypsum concentration was 15% by weight and the concentration of magnesium hydroxide was 3% by weight in the gypsum slurry.

(7) Ammonia recovery step

The gypsum slurry described above was supplied to a counter-current packed column, and ammonia was separated and recovered together with steam. That is, the gypsum slurry, after heated to 80° C., was supplied from the upper portion of the packed column at a rate of 12 m$^3$/hr. Concurrently, steam at 160° C. was supplied from the lower portion thereof as a separating medium at a rate of 2400 kg/hr. The volume of a packing containment chamber of the counter-current packed column was 1.5 m$^3$, and the packings were SUS 303 bell saddles (200 kg). The ammonia component obtained by the separation described above was absorbed in the steam used as the separating medium, and cooled into aqueous ammonia.

(8) Utilization of ammonia (1)

Aqueous ammonia was transported to an ammonia separation column through the transportation pipelines of small inner diameter of 20 mm and ammonia was separated. The ammonia separation column was disposed in a battery limit of an ammonia supply device in the downstream of an exhaust channel of a combustion furnace collecting the combustion ashes of petroleum fuels used in the present example, and was present at a place spaced by 900 m from the position of the packed column. For the separating procedure, the aqueous ammonia described above was supplied from the upper portion of the separating column and steams at a temperature of 150° C. was supplied as the separating medium from the lower portion of the packed column.

After mixing the heated air with a wet ammonia gas obtained in the ammonia separation column (water content: 30 wt %) to form a gaseous mixture (ammonia content 1:1 wt %), and heating to 150° C., the resultant mixture was sprayed from nozzles of the ammonia supply device described above with the nozzle ports being disposed to the inner wall surface of the channel downstream to the exhaust gas channel of the combustion furnaces. In this way, ammonia was utilized as a neutralizing agent for a sulfate gas contained in the exhaustion gases of the combustion furnace.

(9) Utilization of ammonia (2)

Aqueous ammonia was transported through a fine pipeline of small inner diameter of 20 mm to an aqueous ammonia storage vessel for the metal oxidation step and supplied from the aqueous ammonia storing vessel to the metal oxidation vessel.

(10) Gypsum recovery step

A gypsum slurry was supplied continuously at a rate of 14 m$^3$/hr to a conical horizontal-type continuous decanter and separated into gypsum of 10 wt % of water content and a supernatant. The height of the dam disposed to a discharging portion for the supernatant was controlled so as to contain 0.84 wt% of whole hydroxide concentration and 0.06 wt % of gypsum concentration (corresponding to 7 wt % to the hydroxide converted as the solid) in the supernatant.

After recovering the supernatant to a tank equipped with a stirrer, it was supplied to and treated in a flash plate press batchwise. The amount of processing one batch of solids was set to as 60 kg, and the reduction of the filtration rate to about ½ was judged as clogging. When the foregoing processing was conducted till the clogging occurred, the flash plate press was clogged at the number of batches of 50 times.

By the way, when the solid/liquid separation was conducted in the same manner as described above except for mixing hydroxides into gypsum to be separated in the decanter and changing the whole hydroxide concentration in the supernatant to 0.4% by weight and the gypsum concentration to 0.01% by weight (corresponding to the amount of 0.5 wt % relative to the hydroxides converted as the solid) by elevating the height of dam disposed to the discharging portion of the supernatant, the flash plate press was clogged at the number of batches of 5 times.

Further, as a result of conducting the solid/liquid separation in the same manner as described above except for decreasing the amount of gypsum separated in the decanter and changing the whole hydroxide concentration to 1.0% by weight and the gypsum concentration to 0.2% by weight in the supernatant (corresponding to 20 wt % to the hydroxides converted as the solid) by lowering the height of the dam disposed to the discharge portion of the supernatant.

(11) Evaluation

The operations described above were continued for 330 days and then stopped.

(a) During the processing for ammonia separation, the clogging for the packed columns did not occur at all. After the end of the operation, the packings at the inside thereof were taken out and observed at the surface. As a result, the deposition of gypsum and magnesium hydroxide on the surface of packings could scarcely be confirmed.

(b) The entire amount of the slurry of the combustion ashes in the oxidation vessel was discharged and the surface of the opening of the gas supply pipe and the surface of the stirring blade were observed. As a result, the scaling formed by ammonium metavanadate was scarcely found on both of the surfaces and there was no worry about the clogging of the opening of the gas supply pipe.

(c) The periphery of the cooling surface of the counter-current cooling column in the crystallization step was observed. As a result, there was no scaling of the crystals of ammonium metavanadate and the cooling performance was not substantially lowered.

Reference Example 1

Stripping for free ammonia was conducted in the same manner as in Example 1 except for changing the pH value of the gypsum slurry supplied to the ammonia recovery step to 10. When the ammonia stripping was continued for 60 days, since the slurry began to be over flowed due to the clogging in the packed column, the processing was interrupted. Then, the slurry stagnated in the inside of the packed column was removed and the inside thereof was observed. As a result, a large amount of magnesium hydroxide was deposited on the surface of the packings.

Reference Example 2

Stripping for free ammonia was conducted in the same manner as in Example 1 except for changing the gypsum concentration in the gypsum slurry supplied to the ammonia recovery step to 5% by weight. When the ammonia stripping was continued for 50 days, since the slurry began to be over flowed due to the clogging in the packed column. Then, the processing was interrupted and the slurry stagnated in the inside of the packed column was removed and the inside thereof was observed. As a result, a large amount of gypsum was deposited on the surface of the packings.

What is claimed is:

1. A method for the recovery of products from the combustion ashes of petroleum fuels, collected by a dust collector disposed in an exhaust gas fire flue of a boiler using petroleum fuels, wherein the combustion ashes contain ammonium sulfate, said method comprising preparing a slurry by mixing water with said combustion ashes;

injecting either calcium oxide or calcium hydroxide into said slurry and reacting the ammonium sulfate with either calcium oxide or calcium hydroxide to form gypsum and ammonia;

recovering ammonia from the gypsum slurry by flowing said gypsum slurry down from an upper portion of a packed column and blowing air or steam from a lower portion of the packed column to bring the air or steam into counter-current contact with said gypsum slurry and thereby stripping ammonia therefrom; and separating gypsum from said gypsum slurry.

2. A method according to claim 1, wherein the solid concentration of gypsum in the gypsum slurry is 7 to 40% by weight.

3. A method according to claim 1, wherein the pH value of the gypsum slurry is not less than 11.

4. A method according to claim 1, wherein two units of solid/liquid separators are used in series in the gypsum separation step, the first solid-liquid separator being a centrifugal precipitation-type solid/liquid separator and the second solid/liquid separator being a centrifugal precipitation-type separator or a filtration type solid/liquid separator, said step involving processing said gypsum slurry in said first solid/liquid separator to separate gypsum from a supernatant containing (a) nickel and/or magnesium hydroxide and (b) 1 to 20 weight percent of gypsum, calculated as solids, based on said hydroxides, and processing said supernatant in said second solid/liquid separator to form a solid and waste water.

* * * * *